(12) United States Patent
Crane et al.

(10) Patent No.: US 9,967,234 B1
(45) Date of Patent: May 8, 2018

(54) MINIATURIZED REAL TIME PSEUDO-CROSS DOMAIN DATA COMMUNICATION SYSTEM WITH AIR GAPPED FULL MOTION VIDEO DEVICE AND METHOD

(71) Applicant: The United States of America, as represented by the Secretary of the Navy, Washington, DC (US)

(72) Inventors: Bradford James Crane, Fredericksburg, VA (US); Kevin Dee Shepherd, Stafford, VA (US)

(73) Assignee: THE UNITED STATES OF AMERICA, AS REPRESENTED BY THE SECRETARY OF THE NAVY, Washington, DC (US)

( * ) Notice: Subject to any disclaimer, the term of this patent is extended or adjusted under 35 U.S.C. 154(b) by 225 days.

(21) Appl. No.: 15/139,783

(22) Filed: Apr. 27, 2016

(51) Int. Cl.
| | |
|---|---|
| *H04L 29/06* | (2006.01) |
| *H04N 19/40* | (2014.01) |
| *H04N 19/46* | (2014.01) |
| *H04N 5/225* | (2006.01) |
| *H04L 9/32* | (2006.01) |

(52) U.S. Cl.
CPC ............ *H04L 63/02* (2013.01); *H04L 9/3236* (2013.01); *H04L 63/04* (2013.01); *H04L 63/0428* (2013.01); *H04N 5/225* (2013.01); *H04N 19/40* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 6,108,787 A | 8/2000 | Anderson | |
| 8,068,415 B2 | 11/2011 | Mraz | |
| 8,250,235 B2 | 8/2012 | Harvey | |
| 8,380,913 B2 | 2/2013 | Goldring | |
| 8,498,206 B2 | 7/2013 | Mraz | |
| 8,646,094 B2 * | 2/2014 | Staubly | G06F 21/79 726/26 |
| 8,831,222 B2 | 9/2014 | Menoher | |
| 2007/0182983 A1 * | 8/2007 | Wyatt | G06F 21/50 358/1.15 |
| 2014/0096215 A1 * | 4/2014 | Hessler | H04L 63/0869 726/7 |
| 2017/0094446 A1 * | 3/2017 | Maggiore | H04W 4/008 |

* cited by examiner

*Primary Examiner* — Trang Doan
(74) *Attorney, Agent, or Firm* — Timothy Slabouz

(57) ABSTRACT

The present invention is a device, system and method for providing a more secure full motion video with metadata streaming product. More specifically, the invention is capable of ensuring a more secure video transfer from a less secure input data network to a more secure data receiving network through the use of a firewall on the less secure input network interface, which is used for separating video and discarding other unwanted data, and an Air Gap that physically separates the input and output networks. This physical separation ensures a secure transfer of the "cleaned" input data from the less secure input source to the more secure data receiving network.

21 Claims, 3 Drawing Sheets

MINIATURIZED REAL TIME PSEUDO-CROSS DOMAIN DATA COMMUNICATION SYSTEM WITH AIR GAPPED FULL MOTION VIDEO DEVICE AND METHOD

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

CROSS REFERENCE TO RELATED APPLICATIONS

N/A

COPYRIGHT NOTICE

A portion of the disclosure of this document may contain materials that are subject to copyright protection. The copyright owner has no objection to a single reproduction by anyone of this document or disclosure as it appears in the Patent and Trademark Office patent file or records, but otherwise reserves all copyright rights whatsoever.

REFERENCE TO A SEQUENCE LISTING, A TABLE, OR A COMPUTER PROGRAM LISTING COMPACT DISK APPENDIX

N/A

BACKGROUND OF THE INVENTION

1. Field of the Invention

The present invention is directed, in general, to a communications system, device and method for providing secure transfer of at least full motion video, and for preventing the embedding of unauthorized information in (at least a) video from passing from an unsecure source on an unsecure network to a secure destination on a secure network. More particularly, but without limitation, this invention preferably relates to a network video system including a device that provides for the transmission of one-way video with (or without) metadata across an air gap so it does not require data diodes or other interconnected cross domain solution.

2. Description of the Background Art

Ensuring the confidentiality, integrity and availability of full motion video on secure tactical networks and preventing interception or alteration has been a problem since the introduction of video to combat networks. In the field of computer and network security firewalls and heuristic analysis are and have been used to address security threats to computers and networks connected to the Internet and to protect tactical networks from possible cyberattacks, from sources such as, but not limited to, Trojan horse-type viruses or worms that may be embedded in full motion video or the associated metadata. However, for tactical computer networks, such as those used by government agencies, intelligence communities, and certain commercial applications, conventional security systems or devices such as firewalls do not always provide sufficiently reliable protection.

Currently network security can be attained through the use of one-way data diodes or a "unidirectional network," which can be characterized as a device or network that allows data to only travel in one direction, or by cross domain solutions, which may isolate secure networks from security breaches while still allowing data from a low security environment to enter the network in a controlled manner. As an example of a unidirectional or data diode (or dual diode) system is a product available from Owl Computing Technologies (http://www.owlcti.com). Other alternatives that provide or attempt to provide communications security include: U.S. Pat. No. 8,646,094 to Staubly ('094 Patent), which discloses an apparatus for providing secure data transfer through system devices that include a one-way data link; U.S. Pat. No. 8,831,222 to Menoher et al. ('222 Patent), which discloses a communications system that includes a bilateral unidirectional data transfer system; U.S. Pat. No. 8,498,206 to Mraz ('206 Patent), which discloses a system that is asserted to provide secure one-way data transfer, which is provided through the invention's interface circuitry; U.S. Pat. No. 8,380,913 to Goldring ('913 Patent), which discloses a data diode device; U.S. Pat. No. 8,068,415 to Mraz ('415 Patent), which discloses network interface circuitry that restricts which network components can send and receive data; U.S. Pat. No. 8,250,235 to Harvey et al. ('235 Patent), which discloses a method and system for providing an asserted secure one-way transfer of data that includes the transmission of a data receipt acknowledgement message to the sending network; and U.S. Pat. No. 6,108,787 to Anderson et al. ('787 Patent), which discloses a method and means for interconnecting different security networks that provides at least a portion of its information flow control through use of a diode and a switch means. In general, these previous efforts to provide secure "one-way" communication capabilities rely on unidirectional signal transmission through the use of: one-way signal transmission network devices, interface circuitry or selective path routing switches; and/or use of some form of "data diode." With respect to these foregoing prior art inventions is the reliance on the use of a physical connection between the signal transmission and receiving sides of these inventions, which is a physical characteristic that Applicants' present invention eliminates, and which may allow Applicants' invention to be characterized and used as either a cross domain, but, preferably, a "pseudo" cross domain solution (Applicant's definition of a "pseudo cross domain solution" is stated later herein).

Any solution which does not use a physical connection is or can be considered an air gap (or air gapped) solution and would need a transmitter and receiver that operate within the electromagnetic spectrum. In order to choose an appropriate frequency, besides taking into account any cost constraints, the desired number of receivers of data and the amount of divergence are generally the most important factors to be considered. In general, it is Applicants' belief that the use of the visible light spectrum, 400 THz-700 THz, is best for providing a guaranteed one transmitter to only one receiver security solution. Moreover, the use of optical frequencies requires very low power and cannot be eavesdropped upon unless the receiver is directly in the path of the beam that is transmitting the data. On the other hand, the use of Wi-Fi (frequencies around 2.4 GHz) with a wavelength in the centimeters could allow one transmitter to be received by multiple receivers within a 50-200 foot (or even longer) radius of the transmitter (e.g. a whole home Wi-Fi network). Generally, this Wi-Fi feature or characteristic is not always practical for a security solution, i.e., from a security perspective, it is not a desired feature to provide information to multiple receivers that could include unauthorized receivers. Lastly, although there are novel ideas for use of frequencies between visible light and Wi-Fi, the ease of manufacturing products that use either visible light frequencies or Wi-Fi frequencies provide a favorable cost reduction. Therefore, the foregoing discussion supports the use of visible light as potentially being ideal for a virtually guaranteed one transmitter transmission to only one receiver security solution.

Moreover, it is Applicants' belief that data diodes and cross domain solutions cannot pass full motion video and the associated metadata in real time, which is or can be of significant concern to many users of this type of communications system including tactical users. Furthermore, it is Applicants' belief that these and other previously developed methods for implementing one-way data transfer to a secure network require security and operational recertification and the associated manpower for physical oversight. Lastly, it is well known that in most cases each use of a prior art device must be recertified to the environment it is used. In an ever changing tactical environment, these constraints are either not feasible or not possible.

More specifically it is Applicants' belief that prior art tools, methods and systems for one-way video transfer that include firewalls or specially configured operating systems must be manned, and while these systems may have great flexibility these systems are impossible to efficiently use, or are otherwise incapable of being used in a tactical environment. This is in part based on the complexity of the one-way video transfer means of such systems making them difficult to validate and to verify that such systems' associated interface(s) and data flow is/(are) strictly one-way. Additionally, it is Applicants' belief that it is difficult to prove that any video transmission from these prior art systems is not bypassing, or cannot bypass, these prior art systems' security features.

Therefore, while the devices and/or systems of the above-described patents may provide means for ostensibly secure one-way communications it is the Applicants' belief that there is still a present need to provide a portable, compact, lightweight, low-power consuming, inexpensive and secure "one-way" communication system for the tactical user community as well as for other users (e.g., security vendors) that could benefit from Applicants' invention.

SUMMARY OF THE INVENTION

The present invention is an Information Assurance-certified, Cross Domain, but preferably a Pseudo-Cross Domain solution for transmitting unclassified information to a classified device/component or network. More specifically, the present invention is a system that includes a device for passing video or other data, and more preferably for transmitting unclassified full motion video with the associated metadata or an optical label, to a classified network or other device/component or system capable of receiving video or other data. (Throughout this disclosure, and based on context, Applicants will use the following words interchangeably to refer to their invention: system, device, and interface.)

More specifically, a Cross Domain Solution (CDS) refers to a system, device or interface capable of manually or automatically transferring information between different security classification domains. While a Pseudo-Cross Domain solution is a system, device or interface that only "writes up" (sends data from a lower security to a higher security domain) and thus is not a true cross domain solution and doesn't require certification. In the Information Assurance field the process of "writing up" is allowed without intervention whereas the inverse process of "writing down" is not allowed without a manual review of the data to ensure that the "writing down" data is unclassified. This manual review is due to the fact that a classified system may contain unclassified data, however, an unclassified system is not allowed to contain classified data; therefore, "writing down" data is restricted to unclassified data residing in the classified domain.

In general, the present invention provides a unidirectional data flow solution, i.e., data/video can pass one way (i.e., from the data transmission source to the data receiving device/system/network) and not in the opposite direction. An advantage of this unidirectional data flow is its ability to prevent classified data spillage to an unclassified network, which is of paramount importance to tactical and intelligence community users. (For ease of explanation, the "air gap" used to provide unidirectional data flow associated with Applicants' invention will be referred to hereinafter as either the "Data Flow Guard" or the "Air Gap".) This unidirectional flow of data is required to make the Applicants' invention a pseudo-cross domain, solution.

A non-limiting embodiment of Applicants' invention provides a system and device for ensuring secure video transfer with the associated metadata. And, more specifically, a preferable embodiment of the device is provided in a ruggedized, small footprint enclosure. Without limitation this invention can be characterized as having an unsecure-side and a secure-side. Preferably, on the invention's unsecure-side, the invention includes a firewall; an input interface; an integrated processing unit; volatile memory; a display for showing full motion video with (or without) the associated metadata; and an electrical power supply. In general, the secure-side utilizes similar components as those used on the unsecure-side with at least one of the exceptions being the use of a camera to receive and/or record data instead of a display to transmit data. This data transmission between the display and the camera occurs across the Air Gap (or Data Flow Guard), as described herein. Specifically, but without limitation, the Applicants' invention only allows the transmission of, preferably, visible light (i.e., data, which, preferably, includes both video and the associated metadata) in one direction between the display and the camera (i.e., from the unsecure-side to the secure-side). In other words, this physical separation, implemented by the Data Flow Guard (i.e., the Air Gap) between the unsecure-side and secure-side firewalls ensures the secure transfer of data from the unsecure-side (i.e., low security side) display to the secure-side (i.e., higher security side) camera, and the use of a display and camera forms the basis for the unidirectional data flow. On the secure side a firewall reformats the transmitted metadata received by the camera into known good information only and reattaches this to the full motion video stream received by the camera. Preferably, as a security measure, all non-video (or unauthorized) data is rejected and discarded at the unsecure-side and secure-side firewalls. Still further, network security checks implemented by the firewalls provide video filtering in one direction only, and, thereby, prevents reversed use of the system, i.e., prevents the transmission of data from the secure-side to the unsecure-side by discarding the network data if either side senses the wrong network security digital signature. Lastly, both device firewalls have the ability to check the hash digital signature (e.g. digital signed certificate) on the device, and pass this information to the secure-side and unsecure-side networks. Consequently, either network will quarantine the device (i.e., in other words prevent the device from communicating) should the hash digital signature not match that of the expected signature resident on the networks. Additionally, on the secure-side, the secure-side firewall prevents malformed metadata from passing to the secure-side network i.e., the output network, by discarding the malformed metadata and passing the video to the output network without reintegrating the associated metadata.

More specifically, the Applicants' invention's Data Flow Guard allows full motion video to pass in real time from an untrusted (e.g., unclassified/unsecure) source to a classified network with (what is commonly known in the Information Assurance community as) Mandatory Access Control (MAC). To achieve this, a preferable but non-limiting embodiment of the Applicants' invention uses a micro-miniature display and micro-miniature camera combination—each of which currently having a footprint about the size of a U.S. quarter coin (though Applicants believe that as technology improves smaller footprints are possible). Preferably, the display would be used to show full motion video on the unsecure-side, and the camera would be used to receive and/or record the video on the secure-side. Since the image is display-only and the camera receives and/or records whatever is being shown/displayed at a set distance away from the display an operational Data Flow Guard (or a physical air gap) is (or can be) realized. However, since data cannot be passed in this way, the video image being shown is coupled with an "optical label" that passes only the values of the associated metadata as a series of images in video form, which can be "read" by the camera. As a non-limiting example, an embodiment of the invention would use a type of generated QR code or other information-passing image to create an "optical label".

Based on the foregoing, the Applicants' invention can be viewed as an alternative to any software-based one-way video transfer device/system, or electrically connected hardware-based video transfer device/system. Specifically, the Applicants' invention is both a hardware-based display and camera that has no direct physical or electrical connection between the unsecure-side and secure-side of the device and, therefore, the associated networks ensuring that there is no possibility of data flow in the reverse direction. Consequently, it should be apparent that without reversing the components, i.e., the camera and display, it is not possible to reverse the data flow.

It is known by Applicants' that a somewhat reverse data flow process is certified for use by the security community. For example, unclassified data in a secure environment can be printed and copied and then physically passed to a lower security domain after a manual review. Preferably, without the need for manual intervention, the Applicants' invention is implementing the previously described process in reverse—basically the Applicants invention is 'copying' the input or source data shown on a display via a "camera" that is located on the other side of an air gap (i.e., thus providing Applicants' Data Flow Guard), and, thereby, providing a true unidirectional data flow operation. Therefore, due to the physical properties of displays and cameras there is no physical means to send information in the other direction. In fact, because the Applicants' pseudo-cross domain solution system is or might be considered a MAC in the network security and information assurance fields, data may be passed from the low-side to the high-side without requiring an annual (or more frequent) cross domain solution certification and without requiring human intervention to review the data. It is Applicants' belief that this allows the invention to be the first invention that meets operational needs of tactical users. More specifically, besides the other benefits of Applicants' invention, since a preferable embodiment of Applicants' invention does not require additional manpower to review data (which is not available to tactical users in most cases), any latency associated human intervention is minimized (i.e., latency in this context is the amount of time needed prior to using the data). Moreover, it should be readily apparent that delays to being able to use data could be detrimental, dangerous, and unacceptable to most tactical users.

In another embodiment, this invention can also meet the needs of non-tactical users as it can be converted from a tool for providing secure video transfer to a tool for providing one-way secure data transfer. In general, this can easily be accomplished by reprogramming the processor and/or reconfiguring the firewalls or hardware using well known or otherwise standard methods. Such an embodiment would likewise allow for a reduction or elimination of manpower, and could be used by or for commercial security users who use intrusion detection systems (IDS) and intrusion prevention systems (IPS). More specifically, the system/device can be reconfigured to forward security packets from IDS/IPS systems from an unsecure domain (e.g. demilitarized zone computers) to a secure domain without a manual review. This has the ability to allow a single person on the secure side to review and monitor both unsecure-side and secure-side network traffic reducing a two person job to one. Additionally, since this device and system is developed for tactical use, this device can be used by commercial companies for video monitoring remote sites that need operational flexibility or systems that are capable of being easily ruggedized.

It should be obvious that security is a priority for tactical users; therefore, it is a feature of the invention that it is very secure. As an example, the information assurance community realizes a possibility exists that secure communications devices and systems might be captured by adversaries who could attempt to try to gain access to the command and control tactical network (i.e., the secure-side) by reversing the input and output connections of the device/system. However, preferably due to at least the previously described firewall filtering of the invention, all data but full motion video (or other authorized data) is blocked; therefore, the system cannot be used to access the command and control network (i.e., the secure-side network).

It is also a feature of the Applicants' invention to provide a device and system that will allow the transmission of full motion video from an untrusted source to a classified network.

An additional feature of the invention is to provide an optical label with the image being read on the secure-side. This provides for certain capabilities with the tactical use of unprotected video feeds (e.g., such as those from unmanned aerial vehicles, etc.) on or with classified tactical networks.

Additional features and advantages of the invention will be set forth in the description which follows, and, in part, will be apparent from the description and other parts of the disclosure of the presently described embodiments including the drawings, or may be learned from the practice of the invention. Therefore, other features and advantages of the invention will be realized and attained by the device and system, and method, particularly described in the written description, the drawings, and other portions of this disclosure. Moreover, it is to be understood that the foregoing general and the following detailed descriptions are exemplary and explanatory and are intended to provide further explanation of the invention as claimed.

BRIEF DESCRIPTION OF THE SEVERAL VIEWS OF THE DRAWING

In order to better understand the invention and to see how the same may be carried out in practice, non-limiting preferred embodiments of the invention will now be described with reference to the accompanying drawings, in which.

DETAILED DESCRIPTION OF THE INVENTION

Figure 1:
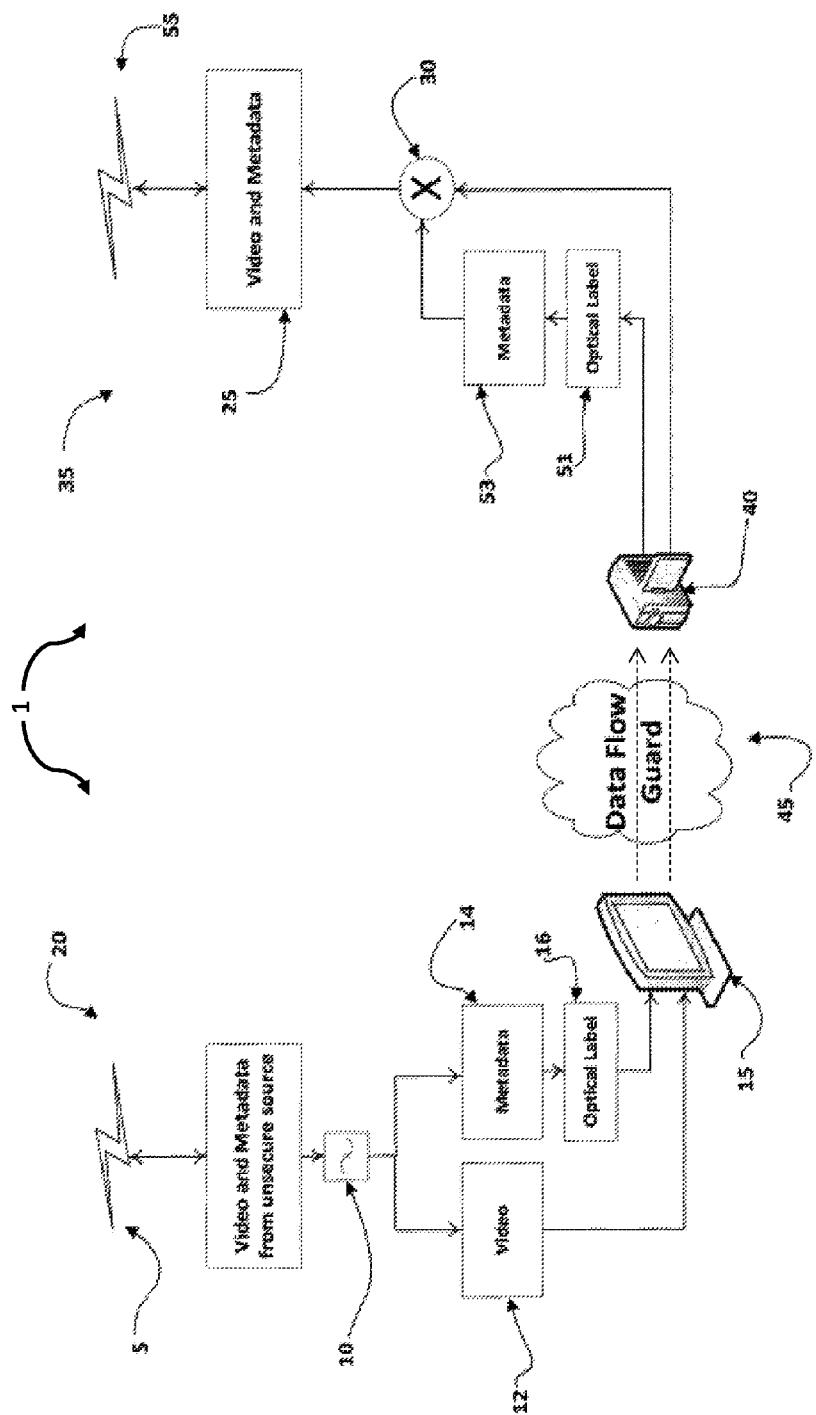
FIG. 1 is a functional view of the data flow paths through the device and system including the flow path from the display to the camera across the invention's Data Flow Guard in accordance with a preferred embodiment of the present invention.

Certain embodiments of the present invention will now be described more fully hereinafter with reference to the accompanying drawings, in which some, but not all embodiments of the invention are shown. Indeed, embodiments of the invention may be in many different forms and thus the invention should not be construed as limited to the embodiments set forth herein; rather these embodiments are provided as illustrative examples only. Furthermore, with the exception of FIG. 1, like numbers refer to like elements throughout and the use of the abbreviation FIG. will be used to identify Figures.

It will be readily understood that the components of the embodiments as generally described and illustrated in the drawings herein could be arranged and designed in a wide variety of different configurations. Thus, the following more detailed description of the certain described embodiments of the system, components and methods of the present invention, as represented by the drawings, is not intended to limit the scope of the invention, as claimed, but are merely representative of embodiments of the invention.

Referring now to the drawings, and more particularly to FIG. 1, there is shown a non-limiting example of a functional view of the data flow paths through the device 1 including the flow path from the display 15 to the camera 40 across the invention's Data Flow Guard 45. It is Applicants' belief that this invention is capable of being used for ensuring secure transmission of one-way video with associated metadata from an unsecure source 5, to the unsecure-side of the device 20, then to the secure-side of the device 35 and/or a secure destination 55 without using a physical connection between the two sides 20 and 35 of the device 1. More specifically, the present invention utilizes a "Data Flow Guard" 45, which may also be referred to as an "air gap" throughout this disclosure of the invention.

Figure 2:
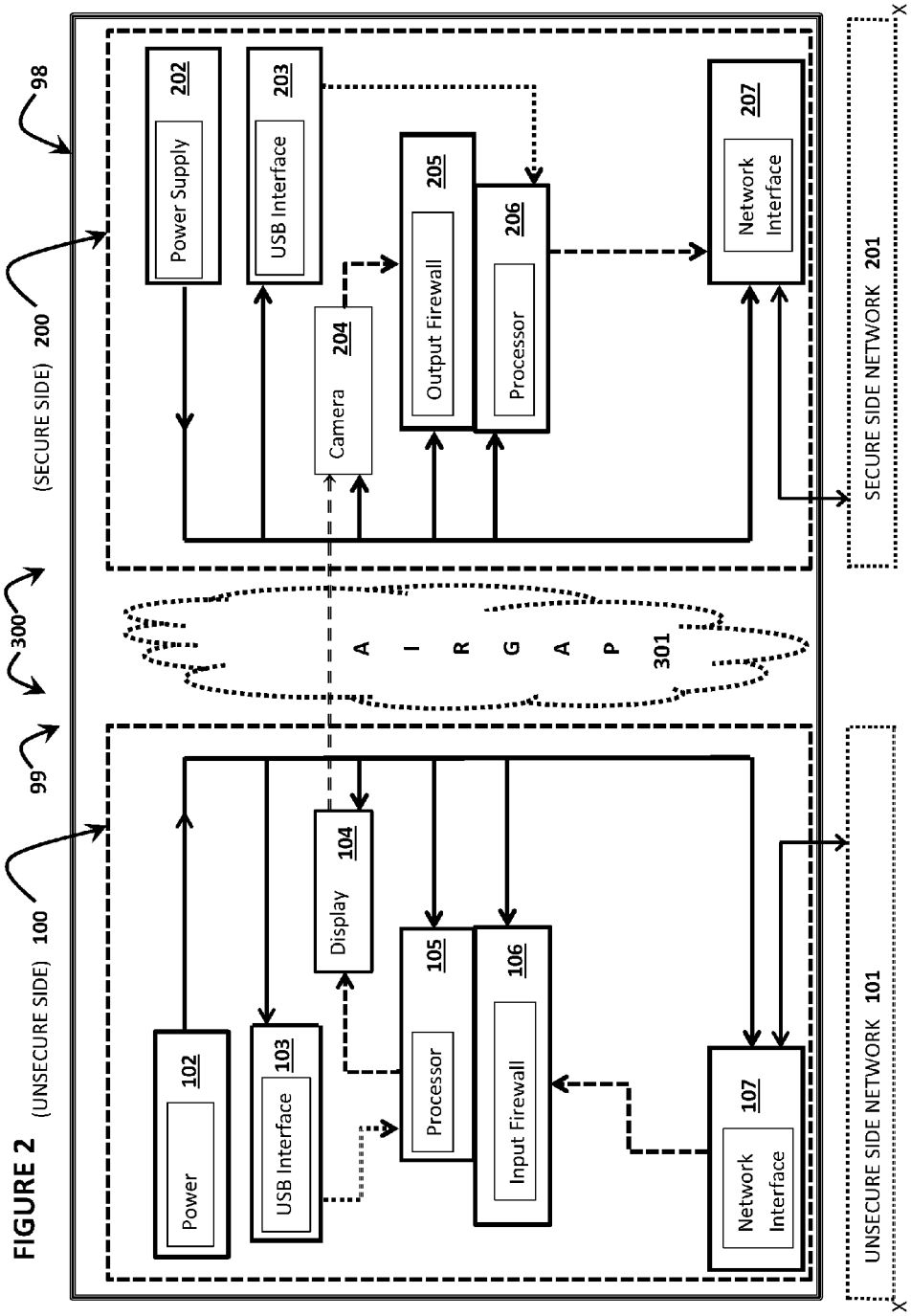
FIG. 2 is a detailed block diagram view of the device and system in accordance with a preferred embodiment of the present invention.

Referring now to FIG. 2, for simplicity, all unsecure-side portions of the device 99 and the system 300 are numbered with 1 as the first digit and all secure-side portions of the device 99 and the system 300 are numbered with 2 as the first digit.

Still referring to FIG. 2, without limitation, the following is a discussion of an embodiment of the present invention device 99 and system 300. Preferably the device 99 and system 300 will operate on any unsecure network (or data source) 101 sending TCP/IP protocol MISP 6.4 (or newer version) formatted video data and passing this video data to a secure network (or device) 201 as TCP/IP protocol MISP 6.4 (or newer version) formatted video data. Preferably, unsecure video information on the unsecure network (or from an unsecure data source) 101 is received through the unsecure-side 100 network interface 107. The preferred embodiment for the host unsecure-side 100 network interface 107 is RJ-45 Ethernet but the present invention may use other conventional interface specifications including but not limited to Ethernet, USB, RS-232, IEEE 1394, or may alternatively be capable of using a custom tactical or other appropriate interface. In other words, the unsecure network (or data source) 101 is preferably connected via a conventional Ethernet interconnection to the corresponding unsecure-side 100 network interface 107. In addition, in some embodiments of the invention the interconnection between the unsecure network (or data source) 101 and the network interface 107 may be used to power the invention. Moreover, in some embodiments, the network interface 107 and USB interface 103 may be connected together via special non-standard connectors, which may be military specification connectors approved for use in tactical devices, instead of using standard USB or RJ-45 Ethernet connectors (not shown).

The unsecure-side USB interface 103 connects directly to the unsecure-side input processor 105 which contains the code for operating the unsecure-side firewall 106, the code for separating the metadata associated with the video from the video, and the code for creating a cryptographic hash to be used as a digital signature. The interface 103 allows an outside device to communicate with the invention for at least the purpose of allowing the programming/reprogramming of the input processor 105 and the input firewall 106 in order to upload or make changes or updates to the code described above. The secure-side 200 also utilizes an USB interface 203 that is similarly connected to the secure-side output processor 206 and secure-side output firewall 205 for the purpose of at least providing the programming/reprogramming function described above. The output firewall 205 contains code for reconstituting the metadata associated with the video and the code for creating a cryptographic hash to be used as a digital signature. To perform these functions, processors 105 and 206 may be any component/device having a processor and associated executable logic (e.g. a Raspberry Pi 2 Model B v1.0 processor is used in an embodiment of Applicants' invention, but another appropriate processor or device can be substituted) that executes program code stored in a memory which, as discussed below, may be over-written, and is preferably non-volatile memory. Moreover, it should be understood and it is well known that hardware can be used to realize or implement the functionality provided by software and vice versa. Therefore, while the use of software as described herein is preferable, it is possible to substitute hardware for software to achieve the same or similar functionality.

The present invention, as described herein, provides multiple means to prevent unauthorized use of the device 99 and, therefore, the system 300. Preferably, any attempt to reverse the device's 99 connections or to reverse engineer and/or reprogram the device 99 will change an internal cryptographic hash and digital signature. More specifically, the internal cryptographic hash is generated in (or by) both processors 105 and 206 based on the software and any changes to the software will change this hash which is used as the device's 99 digital signature. Preferably, but without limitation, this digital signature is sent out on the unsecure-side and secure-side network interfaces 107 and 207 to at least the secure network 201 in response to a security request from the secure network 201. The secure network 201 will have a list of approved digital signatures for this device 99 and will quarantine the device 99 for providing any signature that does not match. This allows the device 99 to be captured by adversaries yet still be capable of providing a high assurance that only approved data loads are used in the processors 105 and 206 as well as ensuring that the unsecure-side (input) firewall 106 and secure-side (output) firewall 205 have not been modified and are still operationally viable components of the device 99. Therefore, when unapproved data is loaded, the device 99 will no longer be capable of providing a valid digital signature to network security scans, i.e., the transmitted digital signature will not be an authorized digital signature, and thus the "unauthorized" device 99 would be placed in a quarantined network status; thereby, preventing use of the device 99 on or with a secure or tactical network 201.

In particular and preferably, but without limitation, the unique mandatory access control (MAC) one-way video link is created by a miniature camera 204 (e.g. a Raspberry Pi Camera Rev 1.3 is used in an embodiment of Applicants' invention, but another appropriate camera or component can be substituted) viewing, i.e., receiving, video and/or other data from a miniature display 104 (e.g. an adafruit 1601 PiTFT display is used in an embodiment of the Applicants' invention, but another appropriate display or component can be substituted) in a completely enclosed, light-proof enclosure 98, i.e., the camera and display are preferably contained within an environment that does not allow any light to enter.

It is realized that other means of providing secure communication are possible, but only embodiments which use the Data Flow Guard 301 (or an air gap) can reasonably be considered as being the same as Applicants' device 99 and, therefore, Applicants' system 300. As an example of dissimilar devices, physical optical fibers, and photodetectors that utilize a "data diode" still require a physical connection/interconnection between the secure and unsecure sides of those systems. In other words, these types of devices do not utilize the mandatory separation required by the Data Flow Guard 301 of the Applicants' invention.

In the present invention, the one-way video flow from the display 104 to the camera 204 is further enforced by the unsecure-side (input) firewall (e.g. an IPtables implementation in Raspberry Pi) 106 and the secure-side (output) firewall (e.g. an IPtables implementation in Raspberry Pi) 205. Preferably, both firewalls 106 and 205 respectively reside in their associated input processor 105 (e.g. a Raspberry Pi 2 Model B v1.0 processor is used in one embodiment of the Applicants' invention, but other similar processors or components can be used as alternatives) and output processor 206 (e.g. a Raspberry Pi 2 Model B v1.0 processor is used in one embodiment of the Applicants' invention, but other similar processors or components can be used as alternatives). Preferably, the unsecure-side USB interface 103 and the secure-side USB interface 203 contain drivers on each associated processor 105 and 206, and the processors 105 and 206 generate a unique cryptographic hash broadcast on the associated USB interfaces 103 and 203. Software residing in memory within each processor 105 and 206 can then be configured with a username, password and cryptographic response such that each USB interface 103 and 203 will only communicate with networks or devices 101 and/or 201 with a correct cryptographic hash response from an external software application designed to update the device (usually loaded on any laptop with a USB connection), and only predefined, i.e., authorized, users with the correct password can update the software. Therefore, by appropriately configuring cryptographic hashes on each USB interface 103 and 203, it is possible to cause software uploads to be restricted to those only coming from preselected networks/computers or other external devices that have a correct hash response, and a correct username and password recognized by, the device 99, i.e., non-approved networks/computers or other external devices cannot reprogram the Applicants' device 99, and non-approved users cannot reprogram the device 99 even though such unauthorized users have use of an approved network/computer or other external device. In other words, changes in the software residing in processors 105 and 206 may not be reprogrammed except by authorized networks/computers or other external devices and only by authorized users.

Alternatively, software embedded in the unsecure-side and secure-side firewalls 106 and 205 respectively, provide a data filtering capability to ensure that only MISP 6.4 (or newer version) video can pass, and all other data, e.g., executable code which is potentially harmful such as a virus, Trojan Horse or other malware, is never passed to the display 104. Preferably, such data filtering is performed by the processors' 105 and 206 firewall software, which is stored in the processors 105 and 206.

Unsecure-side processor 105, in addition to hosting the input firewall 106, also hosts the software code for the separation of the MISP 6.4 (or newer version) metadata from the video stream and subsequent encoding of good metadata values to be used with the video data shown on the display 104. Currently, the Motion Industry Standards Board's Motion Industry Standards Profile (MISP) version 6.4 dated 4 Oct. 2012, is the current standard used in an embodiment of the device 99 and, therefore, the system 300, and MISP 6.4 is the standard currently used to provide full motion video for tactical networks. MISP 6.4 uses the Key-Length-Value data encoding standard for the metadata and it is Applicants' current belief that future updates to such standard should or will use the same or similar data encoding methods/standards. Part of the key to this invention is exploiting the known Key-Length-Value metadata to reduce the amount of data needed to be sent from the display 104 to the camera 204. By using well known coding capabilities, the unsecure-side processor 105 encodes the metadata values in known key and length fields and passes either a 'no value' or a 'value' to one or more pixels on the display 104. These are then encoded for pixel representation on the display 104 to provide an optical label for or to the video data. One well known way to provide such optical label is through the use of QR codes to show the values as colored pixels on the display 104, and then (besides reading the video data) the camera 204 reads the pixels QR code to determine or obtain a value. These QR codes might contain values for video alignment, offset, distance separation, and have a certain data overhead that is not needed for a fixed display 104 and fixed camera 204 placed in a rigid enclosure such as the invention's enclosure 98 (which prevents flexing to keep the display and camera aligned). Therefore, preferably without limitation, an embodiment of the present invention uses a simple code which encodes values corresponding to fixed keys and lengths, but will display in a similar fashion to QR codes without the wasted pixels used for the QR alignment (overhead). Once again this alignment is unnecessary as the display 104 and camera 204 are preferably always in the same alignment relative to each other. Preferably, the encoding and decoding is accomplished by utilizing a simple database. Thus the display's 104 unsecure code (keys and lengths) metadata database stored in non-volatile memory and the camera's 204 secure code (keys and lengths) metadata database stored in non-volatile memory must correspond to each other and will only display matching values. Preferably, the optical label code is unique for this present invention, but is based on similar algorithms and codes like those associated with QR codes. Preferably, in order to display full motion video and simultaneously pass the associated metadata values, the display 104 and camera 204 resolutions must be greater than the resolution required for full motion video alone. These extra pixels will be used to send the associated metadata values portions of the full motion video using the database-like format; thereby, reducing the latency and amount of data required to be sent between the display 104 and the camera 204. Additionally, using a database or database-like format enhances the security of passing full motion video from the unsecure network/ domain 101 to the secure network/domain 201 as only values are passed and not keys and lengths; thereby, preventing unwanted or tampered data from passing across the Data Flow Guard 301. Moreover, only reconstructing known good data, as described below, on or to the secure network/ domain 201 provides additional high, data integrity assurance measures.

The secure-side processor 206, in addition to hosting the secure-side (i.e., output) firewall 205, also hosts the software code for the reintegration of the MISP 6.4 (or newer version) metadata back into the video stream by subsequent decoding of metadata database values received from the camera 204 and re-encoding the Key-Length-Value metadata. Additionally, the secure-side firewall 205 has a function to reject values which fall out of the MISP 6.4 (or newer version) Key-Length-Value defined range for each Key and will not re-encode them. This prevents the secure-side processor 206 from receiving and processing Trojans and other unsecure code attempting to use out-of-range values to disable or break the device 99. The above method is a non-limiting illustration of how the secure-side processor 206 reconstitutes video and the associated metadata to the original known good format and rejects out of range values. In addition, the full motion video received by the camera 204 is encoded in a MISP 6.4 (or newer version) format without associated metadata from the display 104. This allows the secure-side processor 206 to transcode and-provide the output video in any MISP 6.4 (or newer version) valid video format with minimal loss of information. Transcoding creates a known good output, potentially in a different MISP 6.4 (or newer version) video format than the original input to provide compatibility with devices using older MISP standards, and is the means of providing the associated metadata the mandatory access control (MAC) across the one-way Data Flow Guard 301 for the device 99 (and system 300). In one embodiment of the system 300 and device 99, the MISP 6.4 (or newer version) standard is the preferred video standard, but other embodiments of the present invention utilizing other standards or that provide for increasing the resolution of the display 104 and camera 204, increasing the speed or capacity of the processors 105 and 206, and/or changing the dimensions of the device 99 are possible variants.

Preferably, but without limitation, the previously mentioned device container 98, comprises a lightproof, ruggedized enclosure with at least one unsecure-side USB interface 103 (i.e., universal serial bus (USB) connection); at least one unsecure-side network interface 107 (which is preferably a RJ-45 Ethernet connection); as well as at least one of each a secure-side USB interface 203 USB connection and secure-side network interface 207 RJ-45 Ethernet connection. The overall size of the present invention is estimated to be about 3 inches by 2 inches by ½ inches deep, and, preferably, the Display 104 and the Camera 204 are separated by the Data Flow Guard 301, which is preferably located in the center of the longest dimension. Moreover, located on each side of the Data Flow Guard 301 is at least one compact integrated circuit board and one small power supply 102 and 202. The power supplies can be sourced from either Power over Ethernet (PoE) through the at least one RJ-45 connection associated with each of the network interfaces 107 and 207, or from at least one USB connection associated with the USB interfaces 103 and 203 which are connected to power supplies 102 and 202. It should be understood, that it is preferable that the power for the unsecure-side and the secure-side must be sourced separately and are not electrically or physically interconnected. It also should be understood, that other enclosures, dimensions, configurations, connections, and power sources and power distribution arrangements may be used in other embodiments of the present invention device 99 (and system 300).

Figure 3:
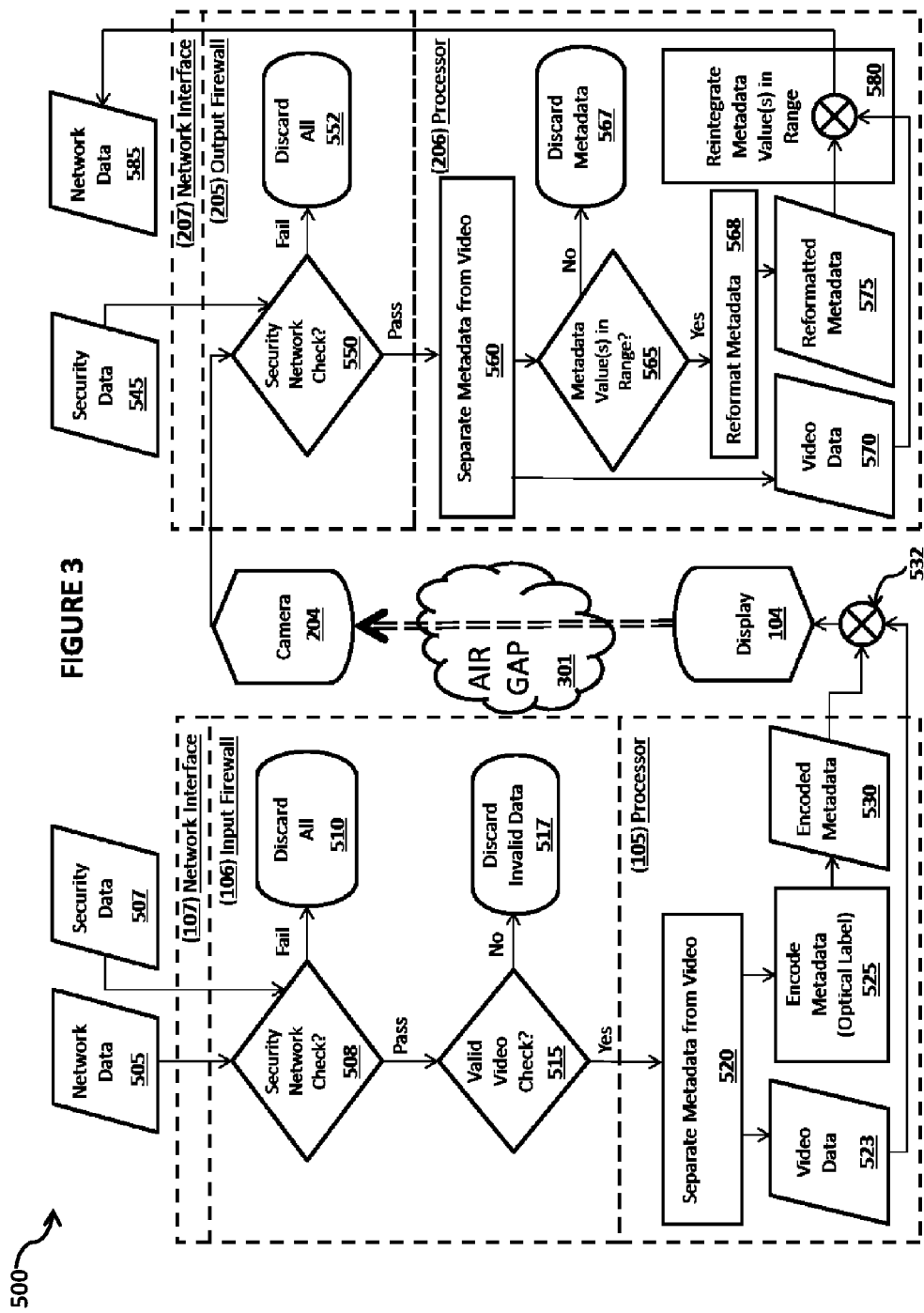
FIG. 3 is a logical flow diagram of the device and system in accordance with a preferred embodiment of the present invention.

Now primarily referring to FIG. 3, a flow chart representation of one embodiment of Applicants' invention's data flow path is shown, and to at least provide a representation of how the data flow path is associated with the hardware of the device, it should be noted that FIG. 3 also shows some like numbered items as shown in FIG. 2. Network data 505 containing Transmission Connection Protocol/Internet Protocol (TCP/IP) data traffic enters the system through Network Interface 107 into the Input Firewall 106 (also see, FIG. 2). The Input Firewall 106 performs a security network check that looks for network security packets and rejects all other protocols, e.g., other than TCP/IP. If the security network check 508 senses a secure network security packet sent by a secure network (e.g. a secure network Host Based Security System (HBSS) message) then it will enter the "Fail" state and discard all packets 510. (ASIDE: Secure or classified data will not be processed on the unsecure-side.) If there is no such message present, then the security network check 508 will enter the "Pass" state and the data/packets will proceed to the valid video check 515 sending all "cleared" TCP network packets to this check 515. The valid video check 515 inspects all packets for MISP 6.4 (or newer) packets. Each MISP 6.4 (or newer) packet is forwarded via the "yes" path to the processor 105 (also see FIG. 2). All other non-MISP 6.4 (or newer) packets are discarded as invalid data via the "no" path 517. In the input processor 105, the associated metadata portion of the video (as Key-Length-Values) are separated 520 from the video portion 523 (e.g. MPEG 4 Part 10 H.264 or MPEG 2 Part 2 H.262 formats). Currently tactical video does not contain the audio format parts in its associated metadata, but another embodiment may include audio. The associated metadata is encoded 525 into an optical label based on each value portion of the Key-Length-Value fields pre-coded in the input processor 105 to be sent across the Air Gap (i.e., Data Flow Guard) 301 (also see FIG. 2). Preferably the list of Key-Lengths is stored in an identical database format and on both the input processor 105 and the output processor 206. The input processor's 105 Encode metadata function 525 includes the storage of the input Key-Length database, and the output processor's 206 Metadata function 568 includes the storage of the output Key-Length database. The optical label (e.g. preferably suitable for display in a QR like code) is digitally added by the input processor 105 (as shown in FIG. 2) and/or by the adder 532 (as shown in FIG. 3) to the video data (e.g. MP4 or MP2 formats) 523 and sent to the display 104 (as shown in both FIGS. 2 and 3). Preferably the display 104 will be large enough, i.e., have the capability, to show both the video data 523 and the encoded associated metadata 530 side-by-side, but the use of other formats or orientations are possible.

Still referring to FIG. 3 (but, also as shown in FIG. 2) the camera 204 views the display 104 across the air gap (i.e., Data Flow Guard) 301. The camera 204 records both the optical label and video shown on the display 104 and captures all this information as video data. The Output Firewall 205 performs a security check that looks for network security packets from the security data 545 coming through network interface 207 and rejects all other protocols—other than TCP/IP. If the security network check 550 senses a secure network security packet sent by the secure network (e.g. a secure network Host Based Security System (HBSS) message) then it will enter the "Pass" state and enable all packets from the camera 204 to pass into the output processor 206. If the security network check 550 does not sense any secure network packets, then it will enter a "fail" state and discard all packets 552 from both the network data 585 and the camera 204. Only packets from the camera 204 are forwarded or passed to the output processor 206. The security data 545 acts as a control for the security network check 550 function but does not physically pass through to the output processor 206. Since the associated metadata is encoded as an optical label, the separate metadata from video 560 function processes the entire video input looking for appropriate markers (e.g. QR code markers) and uses the defined video region based on those markers for processing. This defined video region is sampled at a predetermined rate as an image, and is stored as reformatted metadata 575 after the reformat metadata function 568, which encodes metadata as video at the same frame rate as the video is displayed (providing synchronization) but only for in range metadata values based on values in range 565 function. The remaining full motion video portion is extracted as the video data 570 portion of the data. The optical label portion (data values) from the separate metadata function 560 will be processed against the database (i.e., the allowable valid data ranges) on processor 206. Each value will be compared by the metadata values in range 565 function and all out of range values will be discarded 567, Any discarded metadata 567 value (out of range) will result in no metadata being reformed for that value. All valid values will be sent to the reformat metadata 568 function which outputs the reformatted metadata 575 without those that were not in range values. If no metadata is reformatted, then the reformatted metadata 575 will be blank. Lastly, the video data 570 and the reformatted metadata 575 is combined in the reintegrate metadata 580 function in processor 206 into a combined MISP 6.4 (or alternative) format video and then sent to the network 585. It should be noted that errors in the metadata will cause the video to be output through the Network Interface 207 as network data 585 without associated metadata, while errors in the video will produce no output on Network Interface 207, and, therefore, to the network 585.

While the present invention has been particularly shown and described with reference to the preferred embodiments and various aspects thereof, it will be appreciated by those of ordinary skill in the art that various changes and modifications may be made without departing from the spirit and scope of the invention. The preferred embodiments and the best mode of the present invention are described herein. However, it should be understood that the best mode for carrying out the invention herein described is by way of illustration and not by way of limitation. Therefore, it is intended that the scope of the present invention includes all of the modifications that incorporate its principal design features, and that the scope and limitations of the present invention should be determined by at least the scope of the appended claims, the drawings, and their equivalents.

SEQUENCE LISTING

Not Applicable.

What is claimed is:

1. A unidirectional real-time data streaming system for providing secure transfer of data from a lower security-level data source to a higher security-level network device, comprising:
A lower security-level data source;
A lower security-level module, wherein the lower security-level module is in communication with the lower security-level data source, wherein the lower security level module is configured to receiving and processing a real time input data stream from the lower security-level data source and for providing a data stream of video signals, the lower security-level module comprising:
An input interface, wherein the input interface is configured to receiving the real time input data stream from the lower security-level data source;
A lower security-level module digital processor electrically connected to the input interface, comprising:
A lower security-level module firewall electrically connected to the lower security-level module digital processor; and
An input data stream processing code set resident in the lower security-level module digital processor, wherein the lower security-level module digital processor running the input data stream processing code set and the lower security-level module firewall provides the data stream of video signals;
A video display electrically connected to the lower security-level module digital processor, wherein the video display receives the data stream of video signals and visually displays the data stream of video signals as a video image output; and
A lower security-level module electrical power supply connected and only supplying power to the input interface, the lower security-level module digital processor, the lower security-level module firewall, and the video display;
A higher security-level module, wherein the higher security-level module is configured to receiving the video image output from the video display and for providing a secure, real time streaming data output, comprising:
A camera, wherein the camera receives the visually displayed video image output from the video display and translates the video image output into electrical signals, wherein the electrical signals are processed by the higher security-level module to provide the secure, real time streaming data output;
A higher security-level module digital processor electrically connected to the camera, comprising:
A higher security-level module firewall electrically connected to the higher security-level module digital processor; and
A higher security-level data flow processing code set resident in the higher security-level module digital processor, wherein the higher security-level module digital processor running the higher security-level data flow processing code set and the higher security-level module firewall provides the secure, real time streaming data output;

An output interface electrically connected to the higher security-level module digital processor, wherein the output interface is configured to transmitting the secure, real time streaming data output; and A higher security-level module electrical power supply connected and only supplying power to the camera, the higher security-level module digital processor, the higher security-level module firewall, and the output interface; and A higher security-level network device in communication with the output interface, wherein the higher security-level network device receives the secure, real time streaming data output.

2. The unidirectional real-time data streaming system of claim 1, wherein the lower security-level module and the higher security-level module are not physically connected to each other.

3. The unidirectional real-time data streaming system of claim 1, wherein the lower security-level module is electrically isolated from the higher security-level module.

4. A real time data streaming device for providing secure transfer of data from a lower security-level data source to a higher security-level network, comprising:

An input interface, wherein the input interface receives lower security-level data signals from a lower security-level data source;

A first digital processor electrically connected to the input interface, wherein the first digital processor comprises:
A first firewall electrically connected to the first digital processor; and
A first data processing code set resident in the first digital processor, wherein the first digital processor running the first data processing code set and the first firewall provides a processed data stream;

A video display, wherein the video display receives the processed data stream and converts the processed data stream into video images, and wherein the video images are displayed by the video display;

A first electrical power supply connected and supplying power to the input interface, the first digital processor and the video display;

A camera, wherein the camera receives the visually displayed video images from the video display and translates the video images into video image electrical signals;

A second digital processor electrically connected to the camera, wherein the second digital processor receives the video image electrical signals transmitted by the camera, which comprises:
A second firewall electrically connected to the second digital processor; and
A second data processing code set resident in the second digital processor, wherein the second digital processor running the second data processing code set and the second firewall converts the video image electrical signals to a secure output data stream;

An output interface electrically connected to the second digital processor, wherein the output interface is configured to transmitting the secure output data stream to a higher security-level network in communication with the output interface; and A second electrical power supply connected and supplying power to the camera, the second digital processor, the second firewall, and the output interface.

5. The real time data streaming device of claim 4, wherein the camera has at least the same resolution as that of the video display, and wherein the camera is configured to recording the video images of the first processed data stream visually displayed by the video display at a frame rate at least equal to the frame rate of the displayed video images.

6. The real time data streaming device of claim 4, wherein the first electrical power supply is electrically isolated from the second electrical power supply.

7. The real time data streaming device of claim 4, further comprising: a light-proof enclosure, wherein the real time data streaming device is fully contained within the light-proof enclosure.

8. The real time data streaming device of claim 4, wherein the lower security-level data signals further comprises:
A full motion video stream; and
Encoded metadata embedded in the video stream.

9. The real time data streaming device of claim 7, wherein the input interface, the first digital processor, the video display and the first electrical power supply are physically separated from the camera, the second digital processor, the output interface, and the second electrical power supply.

10. The real time data streaming device of claim 8, wherein the encoded metadata is converted to metadata image signals, wherein the metadata image signals are inserted with the video images to form combination image signals, and wherein the combination image signals are displayed by the visual display.

11. The real time data streaming device of claim 10, wherein the metadata image signals are an optical label.

12. The real time data streaming device of claim 4, wherein the input interface is configured to receiving a first TCP/IP data stream containing full motion video complying with the National Geospatial Agency MISB 6.4 standard intermixed with other network traffic.

13. The real time data streaming device of claim 12, wherein the output interface is configured to transmitting a second TCP/IP data stream containing only MISB 6.4 full motion video signals.

14. The real time data streaming device of claim 13, wherein the first firewall is configured to excluding non-MISB 6.4 video signals from all other network traffic received by the input interface, wherein the first digital processor provides a first data decryption and translation function to extract and de-encode embedded metadata for the full motion video signals shown on the display, wherein the second digital processor provides a second data encryption and translation function to re-encode and reattach extracted metadata back to the full motion video-associated video image electrical signals received by the camera and transmitted by the camera to the second firewall, wherein the second firewall is configured to detecting and discarding abnormal video frames based on predefined behavior and transmitting only MISB 6.4 video signals as the secure output video stream to the output interface.

15. The real time data streaming device of claim 14, wherein the real time data streaming device is configured to only being updated by authorized users using authorized devices.

16. The real time data streaming device of claim 14, wherein the device is configured to creating and reporting a cryptographic hash of a current software load to uniquely identify the configuration of the real time data streaming device to network security devices.

17. A method for providing a real time unidirectional flow of video data from a lower security-level data source to a higher security-level network, comprising the steps of:

Receiving lower security-level video data from a lower security-level data source;

Reconfiguring the lower security-level video data to eliminate security threats and thereby form a first clean data stream;

Processing the first clean data stream to de-encode any remaining metadata;

Transmitting the first clean data stream without metadata as a series of images only, wherein the transmitting is provided by a video display;

Recording the series of images with a camera;

Re-encoding the series of images recorded by the camera with metadata to provide a second clean data stream; and Transmitting the second clean data stream incorporating the re-encoded metadata to a higher security-level network, and wherein the video display and the camera are air gapped.

18. The real time data streaming device of claim 9, wherein the input interface, the first digital processor, the video display and the first electrical power supply are electrically isolated from the camera, the second digital processor, the output interface, and the second electrical power supply.

19. The unidirectional real-time data streaming system of claim 1, wherein the camera and the video display are physically separated by an air gap.

20. The real time data streaming device of claim 4, wherein the camera and the video display are physically separated by an air gap.

21. A real time data streaming device for providing secure transfer of data from a lower security-level data source to a higher security-level network, comprising:

An input interface, wherein the input interface receives lower security-level data signals from a lower security-level data source;

A first digital processor electrically connected to the input interface, wherein the first digital processor converts the lower security-level data signals into clean electrical image signals;

A video display in communication with the first digital processor, wherein the clean electrical image signals are converted to video images that are displayed by the video display;

A first electrical power supply connected and supplying power to the input interface, the first digital processor and the video display;

A camera, wherein the camera receives the video images from the video display and translates the video images into video image electrical signals;

A second digital processor electrically connected to the camera, wherein the second digital processor receives the video image electrical signals transmitted by the camera, and wherein the second digital processor converts the video image electrical signals into a secure output data stream;

An output interface electrically connected to the second digital processor, wherein the output interface is configured to receiving and transmitting the secure output data stream to a higher security-level network in communication with the output interface; and A second electrical power supply connected and supplying power to the camera, the second digital processor, the second firewall, and the output interface, wherein the first digital processor, the video display, the camera, and the second digital processor are all located within a light-proof enclosure, wherein the camera and the video display are separated by an air gap, and wherein the first digital processor, and the video display are electrically isolated from the camera and the second digital processor.

* * * * *